US007231437B2

(12) United States Patent
Boudnik et al.

(10) Patent No.: US 7,231,437 B2
(45) Date of Patent: Jun. 12, 2007

(54) TASK SUBMISSION SYSTEMS AND METHODS FOR A DISTRIBUTED TEST FRAMEWORK

(75) Inventors: Konstantin I. Boudnik, Santa Clara, CA (US); Weiqiang Zhang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 666 days.

(21) Appl. No.: 10/153,303

(22) Filed: May 21, 2002

(65) Prior Publication Data

US 2003/0236812 A1    Dec. 25, 2003

(51) Int. Cl.
  *G06F 15/173* (2006.01)
  *G06F 15/00* (2006.01)
  *G06F 17/00* (2006.01)
(52) U.S. Cl. .................................... 709/223; 715/523
(58) Field of Classification Search ........ 709/201–203, 709/223, 10.01, 27.04; 379/10.01, 27.04, 379/10.1; 715/523–524
See application file for complete search history.

(56) References Cited

U.S. PATENT DOCUMENTS 5,715,373 A * 2/1998 Desgrousilliers et al. ..... 706/47
6,031,990 A * 2/2000 Sivakumar et al. .......... 717/124
6,381,604 B1 * 4/2002 Caughran et al. ............. 707/10
6,397,378 B1 * 5/2002 Grey et al. .................. 717/175
6,668,275 B1 * 12/2003 Alsup et al. ................. 709/208
6,725,399 B1 * 4/2004 Bowman ...................... 714/38
2002/0095436 A1 * 7/2002 Lee ............................ 707/203

OTHER PUBLICATIONS

Sun Microsystems, Jini™ Architecture Specification, Jan. 25, 1999, Sun Microsystems, Revision 1.0, p. 6-7, 10, 13-14, 19-20.*
U.S. Appl. No. 09/953,223 entitled Distributed Processing Framework System by Avvari et al.
Edwards, "The Five Key Concepts of Jini", *Core Jini*, The Sun Microsystems Press JAVA Series, pp. 64-78 (1999), XP002265323.
Sun Microsystems Inc., "The JINI™ Architecture Specification (AR)", JINI—Specifications, Community Resources Specifications, Version 1.0, pp. 1-12 (Jan. 1999).
Arnold, "The Jini™ Architecture: Dynamic Services in a Flexible Network", DAC 99, New Orleans, Louisiana, pp. 1-6 (1999).

* cited by examiner

*Primary Examiner*—William Vaughn
*Assistant Examiner*—Peling A Shaw
(74) *Attorney, Agent, or Firm*—Martine Penilla & Gencarella, LLP

(57) ABSTRACT

A system and method of receiving tasks in a distributed test framework (DTF) includes receiving a task in a task feeder. The task is in a task feeder-specific format. The received task is converted to a DTF-specific format and the converted task is scheduled for submission in the DTF.

28 Claims, 7 Drawing Sheets

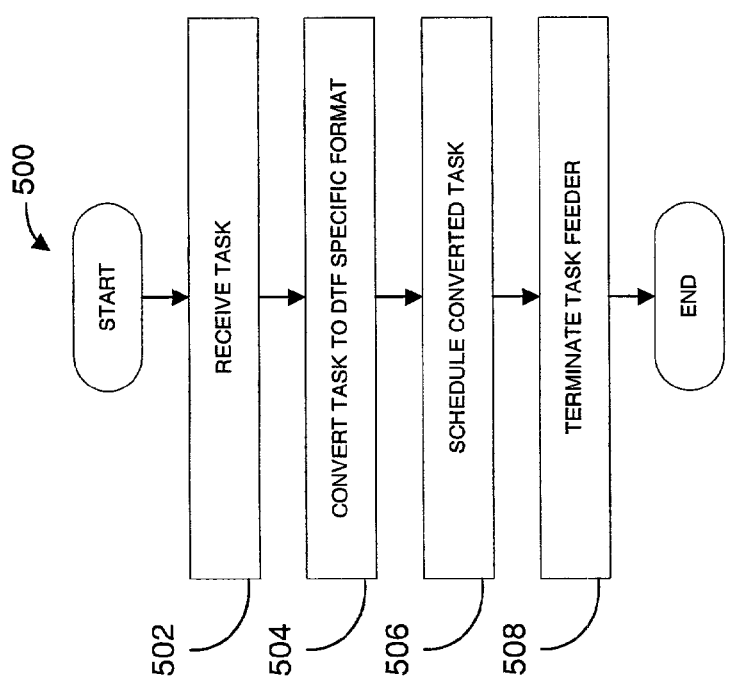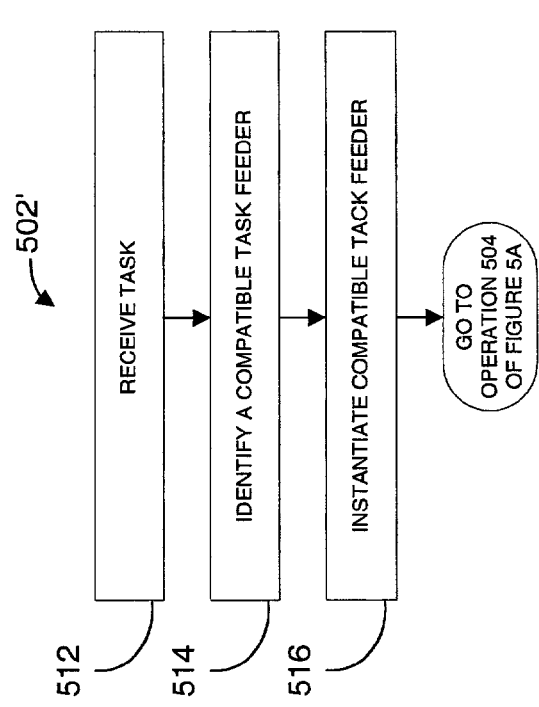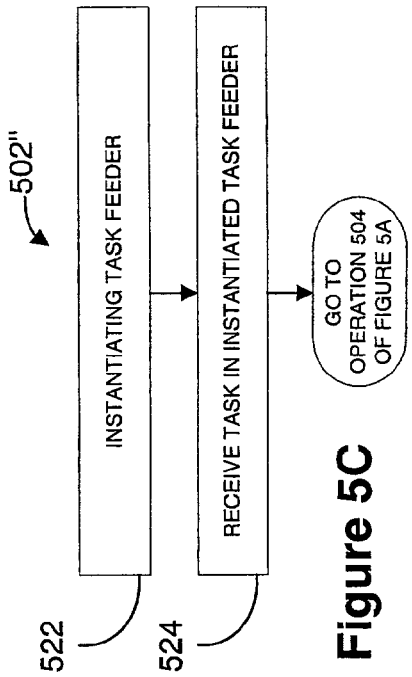
Figure 5A
Figure 5B
Figure 5C

TASK SUBMISSION SYSTEMS AND METHODS FOR A DISTRIBUTED TEST FRAMEWORK

CROSS REFERENCE TO RELATED APPLICATIONS

This application is related to U.S. patent application Ser. No. 09/953,223 filed on Sep. 11, 2001 and entitled "Distributed Processing Framework System," which is incorporated herein by reference in its entirety.

BACKGROUND OF THE INVENTION

1. Field of the Invention

This invention relates generally to distributed software execution, and more particularly to a methods and systems for submitting tasks via a non-proprietary, common format.

2. Description of the Related Art

Software is used to perform daily tasks at a rapidly increasing rate. New software is therefore being developed at an even more increasing rate. Assessing software reliability through software testing has therefore become an imperative stage in software development cycle. Software testing finds and eliminates defects (i.e., bugs) in software, which if undetected, can cause the software to operate improperly. In general, a stand-alone computer or a network of computer resources can be used to perform software testing. When a stand-alone computer system is used to perform the software testing, the computer system is programmed to run a test selected by the software user. When a network of computer resources is used, the user must manually add and delete the computer resources to the network, program the master computer system and the server, initiate the running of a user-selected test, and run the test on the group of dedicated computer systems coupled to the server. A distributed testing of this sort presents launch and control problems, as described next with reference to FIG. 1.

FIG. 1 is a block diagram showing a prior art distributed test configuration 100. The distributed test configuration 100 includes several test systems 102a–102c, each executing a test application 104a–104c. Tests are submitted by manually entering the tests in a test sub-directory under an application to be tested.

Unfortunately, in the distributed test configuration 100 all tests must be submitted to meet the specific format requirements of the distributed test configuration 100. Further, each task for each test must be manually entered into the application under test sub-directory in the distributed test configuration 100. Manually entering the required tests in the required format is not a problem when the distributed test configuration 100 is readily accessible to a user, however, if as is often the case, the distributed test configuration 100 is isolated from a user, the user will be unable to enter the tasks required to perform the desired testing. The distributed test configuration 100 can be isolated from a user by a firewall or other isolation technique.

In view of the foregoing, there is a need for a more easily accessible task submission system and method for the distributed test framework such as distributed test configuration 100.

SUMMARY OF THE INVENTION

Broadly speaking, the present invention fills these needs by providing a task submission system and method for the distributed test framework. It should be appreciated that the present invention can be implemented in numerous ways, including as a process, an apparatus, a system, computer readable media, or a device. Several inventive embodiments of the present invention are described below.

A system and method of receiving tasks in a distributed test framework (DTF) includes receiving a task in a task feeder. The task is in a task feeder-specific format. The received task is converted to a DTF-specific format and the converted task is scheduled for submission in the DTF.

Scheduling the converted task can also include storing the converted task in an application under test sub-directory.

Converting the task to a DTF-specific format can include identifying at least one method required to execute the task.

The task feeder can be included in a communication module of the DTF.

In one embodiment, the DTF is part of a first network. The task can be received from a source outside the first network.

The task feeder can be an email feeder, a remote messaging feeder, a Java messaging service feeder, a socket feeder, a file feeder, a FTP feeder or an HTTP feeder.

Another embodiment includes a system for receiving tasks in a distributed test framework (DTF). The system includes a system server group. The system server group includes a service component and a system controller. The system controller includes a test suite management module; and a communication module that includes an interface and at least one task feeder in communication with the interface, the feeder for receiving a task. The DTF also includes a test system group in communication with the system server group.

In one embodiment, the interface includes a plurality of methods required to execute the task.

In one embodiment the first network includes a firewall or other similar isolation system for isolating the first network from other outside sources.

Another embodiment includes a system and method of receiving tasks in a distributed test framework (DTF) that includes instantiating a first task feeder. A first task is received in the first task feeder. The first task is in a first task feeder-specific format. The first task is converted to a DTF-specific format and the converted first task is scheduled. The first task feeder is then terminated. A second task feeder can be instantiated and a second task received in the second task feeder. The second task is in a second task feeder-specific format. The second task can be converted to a DTF-specific format and the converted second task is scheduled. The second task feeder can be terminated.

In yet another embodiment, a system and method of receiving tasks in a distributed test framework (DTF) includes receiving a first task. A first task feeder is identified from a group of task feeders, the first task feeder being compatible with the first task. The first task feeder in instantiated and the first task is converted to a DTF-specific format. The first task feeder can then be terminated.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 5A is a flowchart of the method operations of receiving a task in an task feeder such as feeders of FIG. 4 above, in accordance with one embodiment of the present invention.

FIG. 5B is a flowchart of the method operations of one embodiment of operation 502 of FIG. 5A, in accordance with one embodiment of the present invention.

FIG. 5C is a flowchart of the method operations of one embodiment of operation 502 of FIG. 5A, in accordance with one embodiment of the present invention.

DETAILED DESCRIPTION OF THE EXEMPLARY EMBODIMENTS

Figure 1:
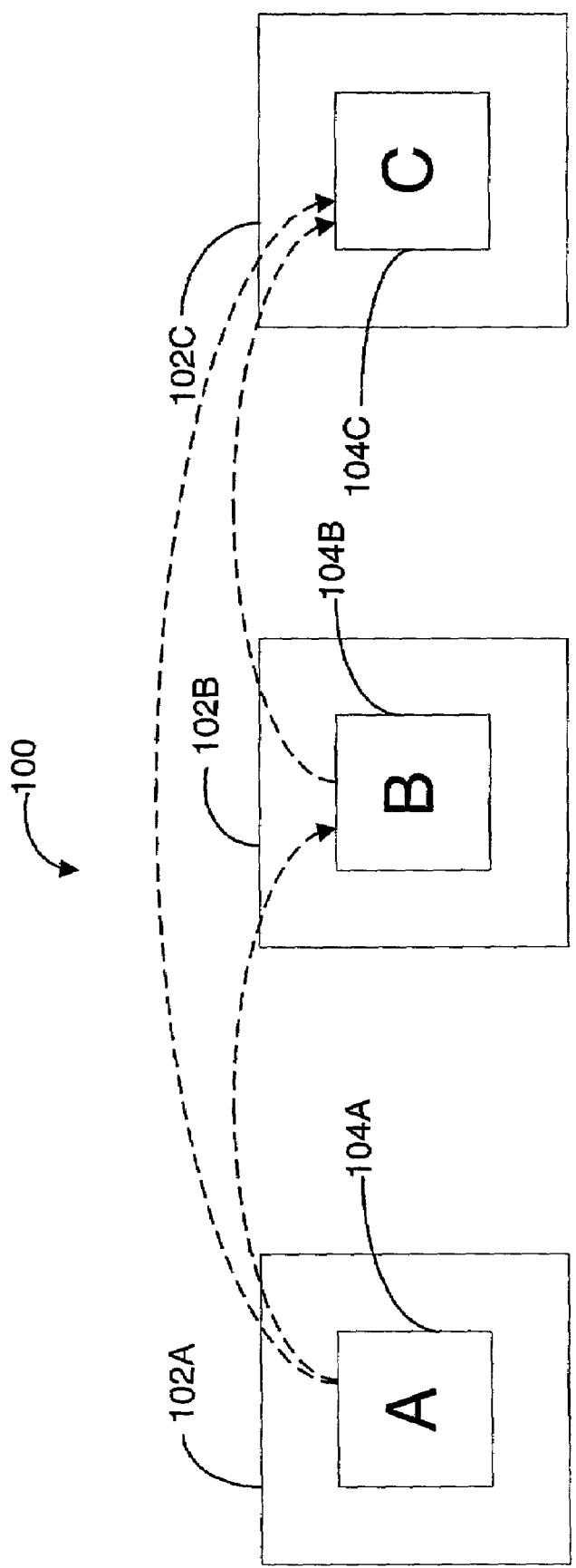
FIG. 1 is a block diagram showing a prior art distributed test configuration.

Several exemplary embodiments of a distributed processing framework (DPF) system that includes a task submission system are described. The present invention has the capability to receive test tasks from sources that are external to the DPF. The ability to receive test tasks from a source external to the DPF greatly enhances the usability. Access to the DPF is increased by the more flexible task entry method. One embodiment of the described task entry method does not require specific formatting like the prior art test task submission methods. The described task entry also does not require direct access to the DPF. It will be apparent to those skilled in the art that the present invention may be practiced without some or all of the specific details set forth herein.

One embodiment of the DPF includes an ad-hoc network of distributed computer systems that can each have different software/hardware configurations. As used herein, an "ad-hoc" or a "dynamic" network is defined as a network in which the computer resources may be part of the network temporarily and for a specific length of time (i.e., spontaneous). In one example, the DPF system of the present invention implements the Jini™ (hereinafter "Jini") technology to provide spontaneous interaction between its components. In this manner, the computer systems attach to and detach from the ad-hoc network of processing resources (e.g., computer resources) without disturbing the DPF system. Accordingly, the computer resources of the present invention are not limited to executing processes submitted to the DPF system of present invention.

In one exemplary embodiment, the DPF system of the present invention is a distributed test framework (DTF) system configured to manage test suite execution on cross-platform dynamically networked computer systems. In one implementation, the DTF system of the present invention includes a server computer system and several ad-hoc network of processing resources configured to spontaneously interact implementing the Jini technology. The server computer system is configured to include a Jini look up service and a system controller configured to manage the processing of the submitted test suites. In one instance, the computer resources join the Jini look up service registering their respective proxies and the corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Figure 2:
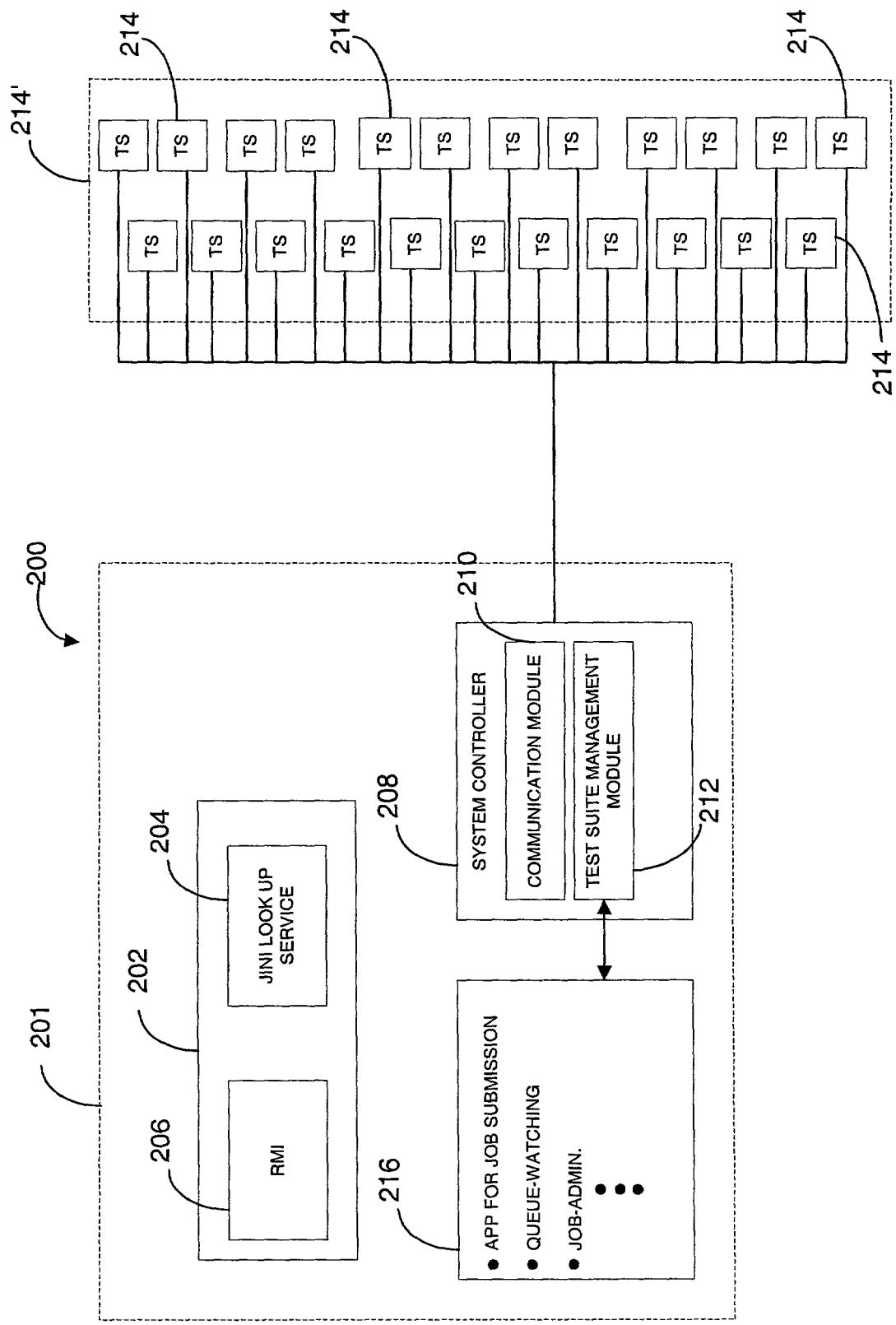
FIG. 2 is a block diagram of a distributed test framework (DTF) system, in accordance with one embodiment of the present invention.

Keeping these brief overviews to Jini and Java as they relate to the present invention in mind, reference is now made to FIG. 2 illustrating a block diagram of a distributed test framework (DTF) system 200, in accordance with one embodiment of the present invention. As shown, physically, the DTF system 200 includes two groups of computer systems: (1) a system server group 201, and (2) a test system group 214'. The system server group 201 includes a service component 202 and a system controller 208. The service component 202 is configured to contain a Jini look up service 204 and a Remote Method Invocation (RMI) 206. In one embodiment, the RMI is designed to handle various communication needs. Comparatively, the Jini look up service 204 is a dedicated process running on the master computer system, server, and is configured to function as a central registry. As used herein, the master computer system is defined as the computer system running the system controller 208. As designed, in one embodiment, the master computer is configured to include both the system controller 208 and the service component 202. However, in a different implementation, each of the system controller 208 and the service component 202 may be included and run by separate computer systems. As designed, the look up service 204 is configured to enable the system controller 208 to locate available computer systems of an ad-hoc network of computer systems to execute a given test execution request using the test system registerable attributes. For instance, the look up service 204 includes registerable attributes, which identify the test machine platform, operating system, and other software and hardware characteristics.

The illustrated system controller 208 includes a communication module 210 and a test suite management module 212. The communication module 210 manages the communication between the system controller 208 and the distributed test systems 214. For instance, the communication module 210 is responsible for locating available test systems 214, running test execution requests, and gathering information regarding the status of the test systems 214. In one example, the system controller 208 manages the communication with the distributed test systems 214 by implementing multiple threads. In this manner, the system controller 208 has the capability to communicate with multiple test systems 214 in parallel. However, it must be noted that in a different embodiment, the system controller 208 may implement any suitable mechanism to manage the communication between the system controller 208 and the distributed test systems 214 (e.g., Jini, RMI, TCP/IP Sockets, etc.). In at least one embodiment, the communication module can also provide an avenue for tasks to be submitted to the controller 208.

The test suite management module 212 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into multiple test execution requests (i.e., jobs).

By way of example, the test suite management module 212 maintains an in-queue directory designed to include almost all the submitted test execution requests. Once the system controller 208 is initiated, the system controller 208 is configured to read each test execution request from files held in the in-queue directory. Once a test execution request is read, it is put into either a wait queue configured to hold test execution requests waiting to be executed or an execution queue designed to hold test execution requests currently being executed. Further information regarding managing the in-queue directory, wait queue, and execution queue will be provided below. As illustrated, in one example, the test suite management module 212 is configured to manage the software applications and user interfaces implemented for job submission, queue watching, job administration, etc., as shown in 216.

The test system group 214' includes several test systems 214 having similar or diverse hardware and software configuration. Although shown as a group, the test systems 214 are not necessarily limited to testing. In fact, the test systems 214 can be computers or systems used by employees of a company for normal desktop work. So long as the test systems 214 are associated with the networked group, the processing power of these test systems 214 can be used. In one embodiment, the test systems 214 can be used during normal working ours when the test systems 214 are running, for example, business applications, or during off hours, thus tapping into potentially huge processing resources that would otherwise be left unused. It should therefore be appreciated that test systems 214 do not necessarily have to be solely dedicated to testing or processing for the system server group 201.

In one embodiment, the test systems 214 are configured to execute the test execution requests dispatched by the system controller 208. Each of the test systems 214 runs an agent process (not shown in this Figure) designed to register the respective test system 214 with the Jini look up service 204. In this manner, the agent process for each test system 214 advertises the availability of the associated test system 214. As will be discussed in further detail below, a machine service component of the agent is used to establish communication between the associated test system 214 and the system controller 208. Specifically, by implementing the Jini attributes, the machine service registers the test system 214 characteristics with the Jini look up service 204. The test system 214 attributes are subsequently used by the system controller 208 to locate a test system 214 suitable to execute a specific test execution request.

While the DTF system 200 of the present invention can physically be divided into two groups, logically, the DTF system 200 of the present invention is comprised of three overall parts: (1) Job submission and other user interfaces; (2) Test scheduler and system controller; and (3) Test execution on remote or local systems.

For the most part, the job/task submission and other user interfaces component is a job queuing system include a variety of applications and user interfaces. As designed, the job/task submission component is configured to perform several functions such as handling job submission, managing queues, administrating jobs, and administrating the ad-hoc network of the distributed test systems.

By way of example, in one implementation, the user interface may be as follows:

Launch system controller: In one embodiment, launching the system controller 208 is performed by running an appropriate shell script. As designed, the shell script is configured to launch the Jini and RMI support servers.

Kill system controller: Finds substantially all the processes, and once found kills each of the processes, individually.

Submit jobs: Before the system controller 208 is launched, an Extensible Markup Language (XML) formatted test-execution-request file is created in the inqueue directory (e.g., that is preferably part of the test suite management module). In this manner, once the system controller 208 is launched, the system controller 208 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 208 is configured to implement various input files.

The second logical component, the test scheduler and system controller, includes the system controller 208 configured to perform the function of managing the job queues and dispatching the test execution requests to test system 214 for processing. Thus, the system controller 208 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 208 by implementing several log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 214 having the required characteristics is available to execute the job.

Figure 3:
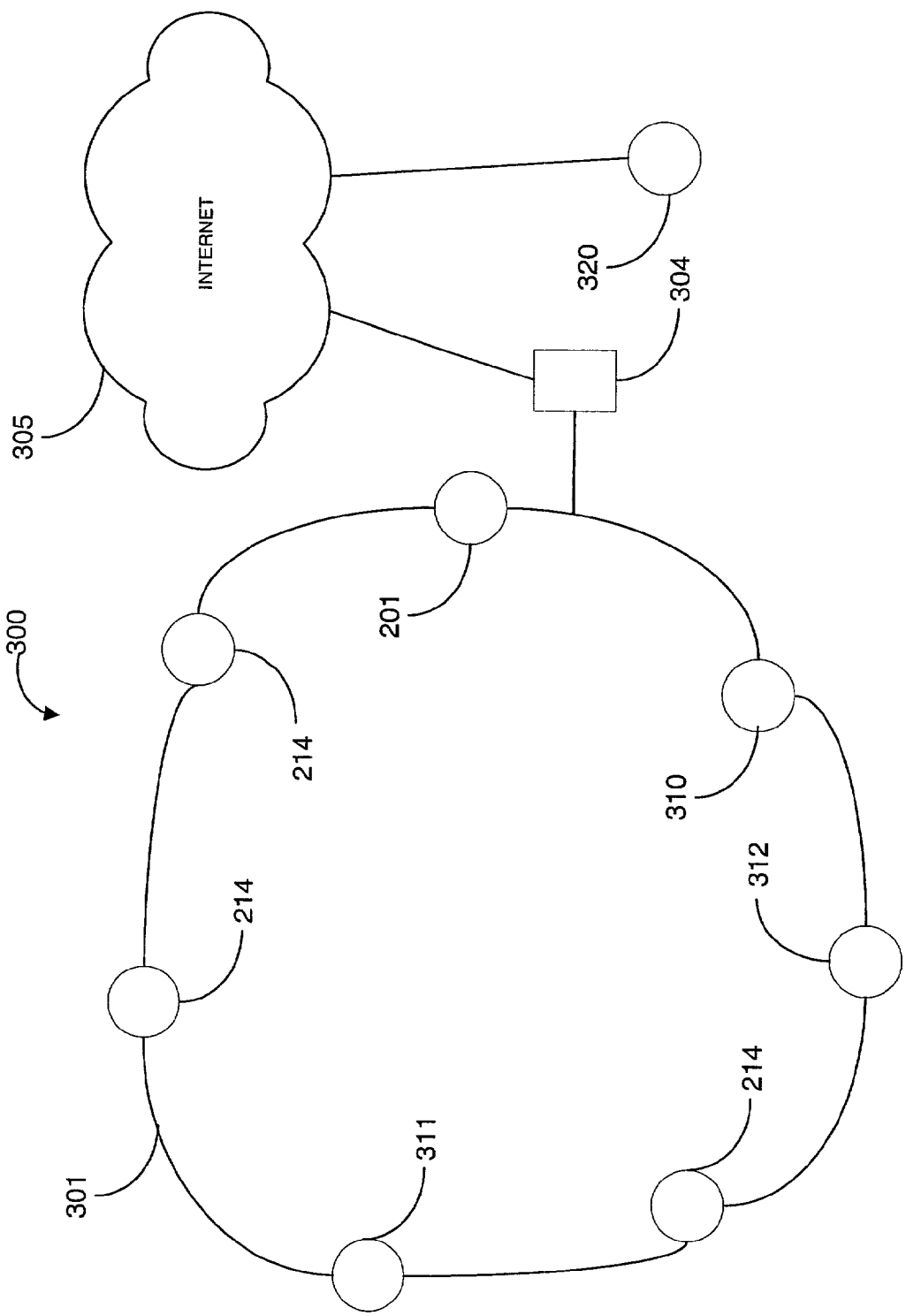
FIG. 3 is a block diagram of a network including a distributed test framework such as described in FIG. 2 above, in accordance with one embodiment of the present invention.

FIG. 3 is a block diagram of a network 300 including a distributed test framework 200 such as described in FIG. 2 above, in accordance with one embodiment of the present invention. The network 300 includes several network nodes 201, 214, 311, 310, 312. The network 300 can also be connected to another network such as the Internet 305, through a firewall 304 or similar isolation system. An outside source 320 may be able to communicate with the network 300 through use of certain acceptable data transmission methods such as email or Java messaging system, through the Internet 305 and the firewall 304. The firewall 304 prevents the outside source 320 from directly accessing any node included in the network 300.

The nodes 201, 214, 311, 310, 312 in the network 300 can include the components of a distributed test framework 200 such as described in FIG. 2 above. For example, the system server group 201 and various test systems 214 that make up the distributed test framework 200. Nodes 311, 310, 312 are other computing resources included within the network 300 and therefore can have direct access to the system server group 201.

A user can input test tasks to the distributed test framework 200 from any of the nodes 311, 310, 312 that have direct access to the system server group 201 as described above in FIG. 2. However, often a user that does not have direct access to the network 300 will need to input a test task to the distributed test framework 200. By way of example, the network is a local area network inside a software company's test laboratory. A user in another office location of the software company may need to use the distributed test framework 200 to test a new application. Under the prior art approach, the user must request another user to enter the required test task to the distributed test framework 200.

Figure 4:
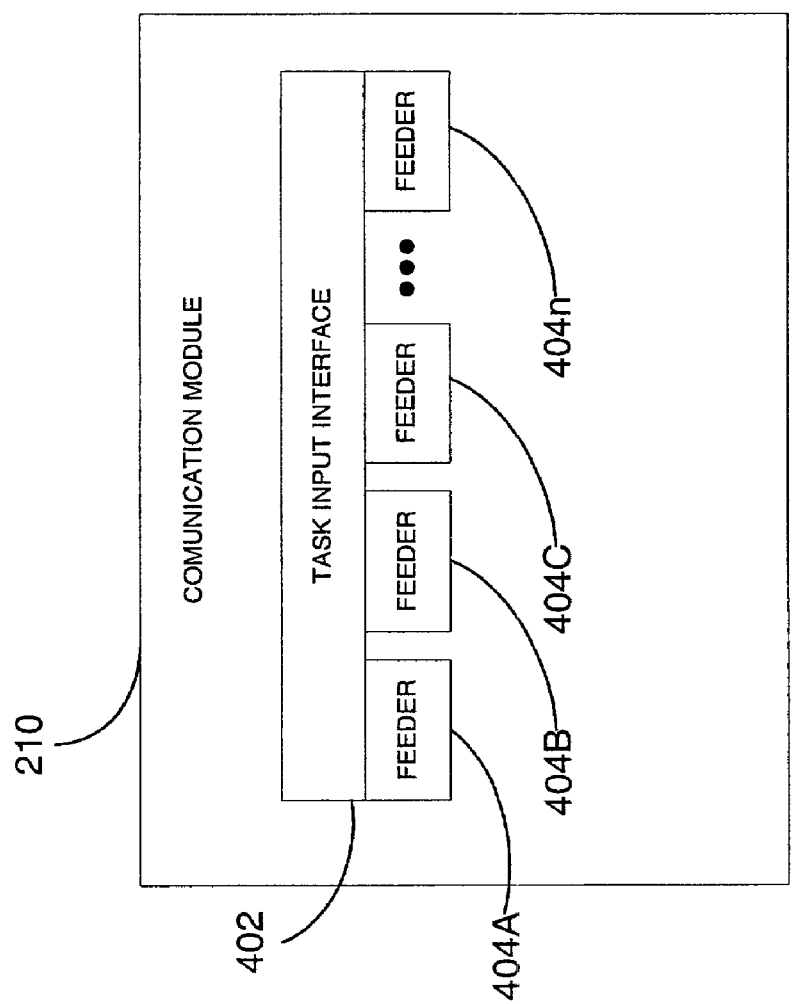
FIG. 4 is a block diagram of the communication module 210 in accordance with one embodiment of the present invention.

FIG. 4 is a block diagram of the communication module 210 in accordance with one embodiment of the present invention. The communication module 210 includes a task input interface 402 and several task feeders 404A–404n. The task feeders can be an email (simple mail transfer protocol (SMTP)) feeder, a Java messaging service (JMS) feeder, a remote messaging service (RMI) feeder, a socket feeder, a file feeder, an hypertext transfer protocol (HTTP) feeder, a file transfer protocol (FTP) feeder or other feeder that is capable of handling data transfers similar to those feeders described above.

FIG. 5A is a flowchart of the method operations 500 of receiving a task in an task feeder such as feeders 404A–404n of FIG. 4 above, in accordance with one embodiment of the present invention. In operation 502 a task is received. In one embodiment, the task is received in the feeders 404A–404n. Each of the feeders 404A–404n is capable of receiving a task in a format that is specific to the particular feeder. By way of example, feeder 404A can be an email feeder that is capable of receiving an email. A received email would include a task such as a script. In one embodiment, an emailed task could include a predetermined format of information from which a task could be extracted. Similarly, other types of tasks could also be received and task extracted or converted there from.

The received task is converted to a standard DTF-specific format in the feeders 404A–404n, in operation 504. The DTF-specific format can be the same type of task that is manually input to the DTF as described in the prior art, in one embodiment. Alternatively, the DTF-specific format can be any format that is a common output from each of the feeders 404A–404n. In one embodiment, the converted task is then output from the feeders 404A–404n to the task input interface 402. The task input interface 402 can further convert the converted task. In one embodiment the task input interface 402 converts the converted task to at least one method that will execute the defined tasks.

In operation 506 the converted task is scheduled. In one embodiment, scheduling the converted task includes storing the converted task in a sub-directory assigned to the application under test. The method operations 500 then end.

In one embodiment, the method operations 500 can also include terminating the task feeder.

FIG. 5B is a flowchart of the method operations 502' of one embodiment of operation 502 of FIG. 5A, in accordance with one embodiment of the present invention. In operation 512 a task is received such as received in the communication module 210. In operation 514 the received task is examined to determine the type of task and a corresponding compatible type of task feeder is identified. The identified task feeder is instantiated in operation 516. Instantiating only the needed task feeder, as needed, allows more efficient use of the computing resources of the system server group 201. The method operations continue in operation 504 of FIG. 5A.

FIG. 5C is a flowchart of the method operations 502Δ of one embodiment of operation 502 of FIG. 5A, in accordance with one embodiment of the present invention. In operation 522 at least one task feeder is instantiated. In operation 524, the received task is received in the instantiated task feeder. Instantiating task feeders, as needed, allows more efficient use of the computing resources of the system server group 201. The method operations continue in operation 504 of FIG. 5A.

Figure 6:
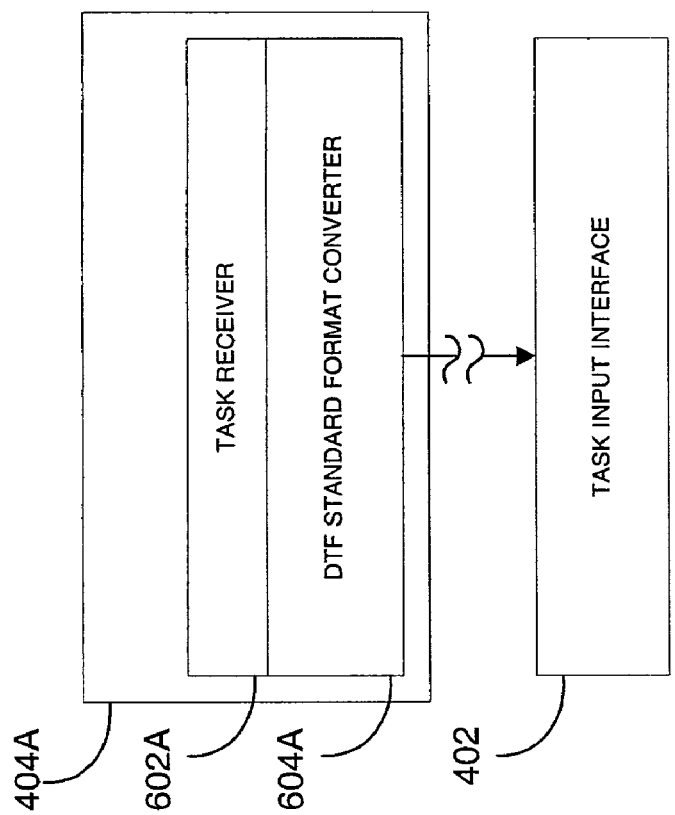
FIG. 6 is a block diagram of an exemplary feeder in accordance with one embodiment of the present invention.

FIG. 6 is a block diagram of an exemplary feeder 404A in accordance with one embodiment of the present invention.

The feeder 404A includes a task feeder 602A and a DTF standard format converter 604A. The feeder 404A is also in communication with the task input interface 402.

Figure 7:
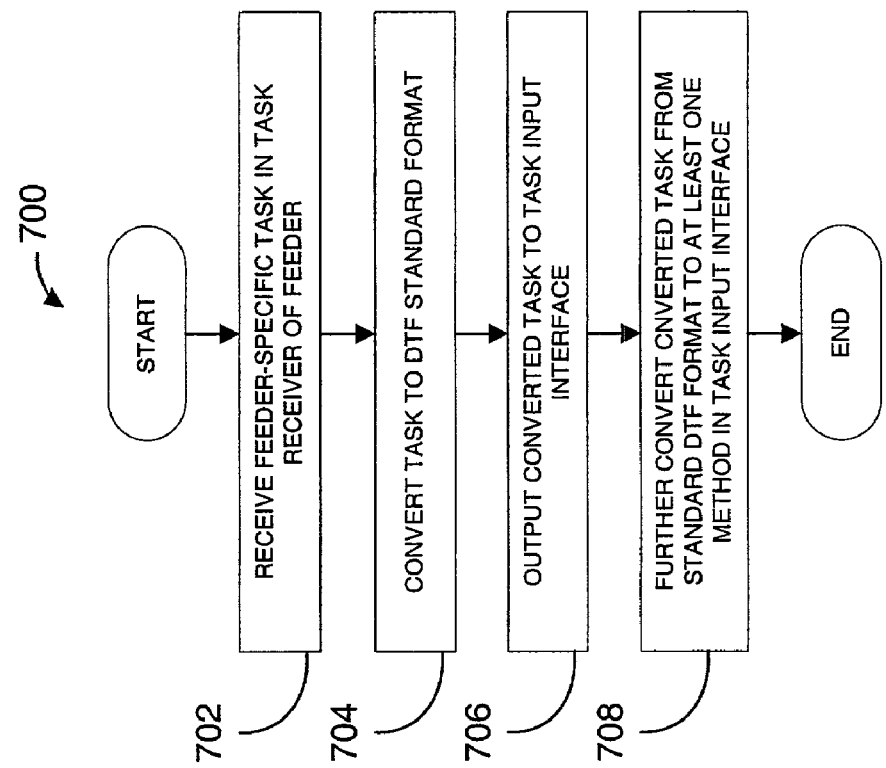
FIG. 7 is a flowchart of the method operations of receiving and converting a task in a feeder and the task input interface, in accordance with one embodiment of the present invention.

FIG. 7 is a flowchart of the method operations 700 of receiving and converting a task in a feeder 404A and the task input interface 402, in accordance with one embodiment of the present invention. In operation 702, the task receiver 602A receives the task in the feeder 404A. In one embodiment, the task receiver 602A is only capable of receiving a task that is in a feeder specific format therefore a compatible feeder is required to receive the task.

In operation 704 the DTF standard format converter 604A converts the received task from the feeder specific format into a DTF standard format that can be input to the task input interface 402.

In operation 706, the DTF standard format converted task is output to the task input interface 402. In operation 708, the task input interface 402 converts the DTF standard format converted task to at least one method to execute the tests defined in the task.

Figure 8:
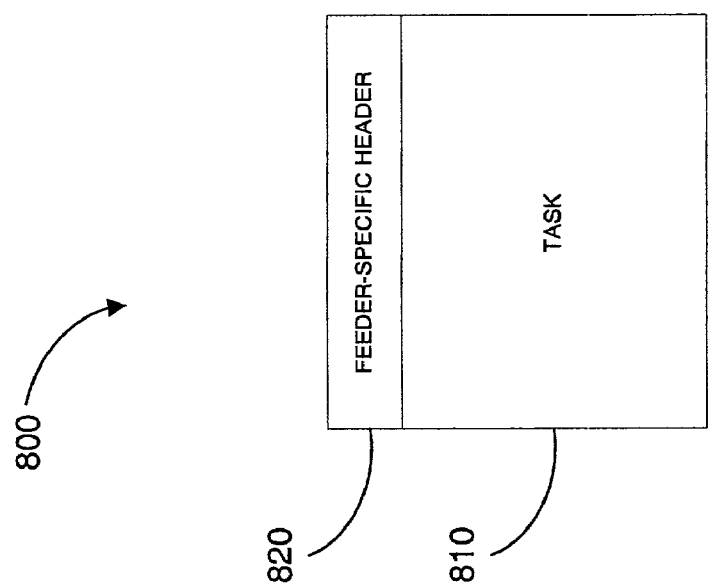
FIG. 8 is a block diagram of a feeder-specific formatted task in accordance with one embodiment of the present invention.

FIG. 8 is a block diagram of a feeder-specific formatted task 800 in accordance with one embodiment of the present invention. The feeder-specific formatted task 800 includes the task 810 and a feeder-specific header 820. The task 810 can be in any format suitable to transfer to the task input interface 402 such as a script, or plain text file or an XML document. The feeder-specific header 820 is a header attached to the task 810 or may also encompass the task 810 (e.g., an envelope header). In one embodiment, the feeder-specific header 820 identifies the specific feeder 404A–404n that is compatible with the feeder-specific formatted task 800. The following is an example of a task:

```
<?xml version="1.0" encoding="US-ASCII" ?>
<!DOCTYPE taskrequest SYSTEM
    "http://hestia.sfbay.sun.com/DTF/Master-WSes/DTF3.0/DTD/
    taskrequest.dtd"[
<!NOTATION app SYSTEM
    "file:///net/ultracos.sfbay/export/cos/dtf3-ws/dest/">
]>
<taskrequest priority="10">
    <jobname jobname="priority_task"/>
    <suitename suitename="shell-gen" />
    <jdk dir="/usr/java1.3" runtime=""/>
    <when year="2002" month="11" day="20" hour="24" minute="40"
    second="59–1234"/>
    <result dir="/net/ultracos/export/cos/knight_ws/results/"
emailto="user@companydomain.com" emailcc="" subject="Custom
service testing" />
    <attr key="software.os.name" value="SunOS" />
    <attr key="software.os.arch" value="sparc" />
    <user_defs key="special_key" value="special_value" />
</taskrequest>
```

The above example of a task 810 is an XML document. Other types of files and documents can also be used to identify task.

The feeder-specific header 820 can be an email header or a JMS header or any other type of header that is compatible with any type of feeder 404A–404n that can be used to submit tasks to the distributed test framework 200.

Although the present invention mainly describes exemplary embodiments of a distributed test framework system designed to execute a test suite, it must be understood by one having ordinary skill in the art that the distributed processing framework of the present invention can be implemented to run any computer process. Additionally, although the present invention is described based on the Jini technology, other network technologies having the capability to create an ad-hoc group of computer resources may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 5A–5C and 7 are not required to be performed in the order illustrated, and that all the processing represented by the operations may not be necessary to practice the invention. Further, the processes described in FIGS. 5A–5C and 7 can also be implemented in software stored in any one of or combinations computer readable memory.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of receiving tasks in a distributed test framework (DTF) comprising:
    receiving a task in a task feeder, wherein the task is in a task feeder-specific format and wherein the task includes a corresponding plurality of computing system attributes required to execute the task, a location of a required external resource, and one or more pre-execution configuration parameters required to execute the task, the task feeder is included in a communication module in a server, the server coupled to a plurality of ad-hoc computing resources;
    leasing at least one of the plurality of ad-hoc computing resources, wherein the server includes a look-up service, the look-up service including a list of the plurality of leased ad-hoc computing resources and the look-up service includes a plurality of attributes corresponding to each one of the leased ad-hoc computing resources;
    converting the task to a DTF-specific format;
    scheduling the converted task including:
        recording a plurality of server activities in a log manager;
        maintaining a wait queue in a queue manager, the wait queue including the task waiting to be executed, and
        maintaining an execution queue in a scheduler, the execution queue including a current status corresponding to one or more converted dispatched tasks;
    selecting at least one of the plurality of leased ad-hoc computing resources from the list wherein the selected at least one of the plurality of leased ad-hoc computing resources includes the corresponding plurality of attributes required to execute the converted task waiting to be executed in the wait queue;
    dispatching the converted task to the selected at least one of the plurality of leased ad-hoc computing resources at a selected time to execute the converted task; and
    maintaining the current status of the dispatched converted task in the execution queue.

2. The method of claim 1, wherein scheduling the converted task includes storing the converted task in an application under test sub-directory.

3. The method of claim 1, wherein converting the task to a DTF-specific format includes identifying at east one method required to execute the task.

4. The method of claim 1, wherein the DTF is part of a first network.

5. The method of claim 4, wherein the task is received from a source outside the first network.

6. The method of claim 1, wherein the task feeder is an email feeder.

7. The method of claim 1, wherein the task feeder is a remote messaging feeder.

8. The method of claim 1, wherein the task feeder is a Java messaging service feeder.

9. The method of claim 1, wherein the task feeder is a socket feeder.

10. The method of claim 1, wherein the task feeder is a file feeder.

11. The method of claim 1, wherein the task feeder is a FTP feeder.

12. The method of claim 1, wherein the task feeder is a HTTP feeder.

13. A system for receiving tasks in a distributed test framework (DTF) comprising:
    a system server group including:
        a service component; and
        a system controller including:
            a test suite management module; and
            a communication module that includes an interface and at least one task feeder in communication with the interface, the feeder for receiving a task, wherein the task includes a corresponding plurality of computing system attributes required to execute the task, a location of a required external resource, and one or more pre-execution configuration parameters required to execute the task; and a test system group in communication with the system server group, the test group including a plurality of leased ad-hoc computing resources, the service component including a look-up service including a list of the plurality of leased ad-hoc computing resources, the look-up service includes a plurality of attributes corresponding to each one of the leased ad-hoc computing resources;

a log manager for recording a plurality of server activities;

a task converter capable converting the received task to a DTF-specific format;

a wait queue in a queue manager, the wait queue including the task waiting to be executed and an execution queue in a scheduler, the execution queue including a current status corresponding to one or more converted dispatched tasks.

14. The system of claim 13, wherein the task feeder is an email feeder.

15. The system of claim 13, wherein the task feeder is a remote messaging feeder.

16. The system of claim 13, wherein the task feeder is a Java messaging service feeder.

17. The system of claim 13, wherein the task feeder is a socket feeder.

18. The system of claim 13, wherein the task feeder is a file feeder.

19. The system of claim 13, wherein the task feeder is a FTP feeder.

20. The system of claim 13, wherein the task feeder is a HTTP feeder.

21. The system of claim 13, wherein the interface includes a plurality of methods required to execute the task.

22. The system of claim 13, wherein the DTF is part of a first network.

23. The system of claim 22, wherein the task is received from a source outside the first network.

24. The system of claim 23, wherein the first network includes an isolation system that isolates the first network from the source outside the first network.

25. A method of receiving tasks in a distributed test framework (DTF) comprising:
 instantiating a first task feeder;
 receiving a first task in the first task feeder, wherein the first task is in a first task feeder-specific format and wherein the task includes a corresponding plurality of computing system attributes required to execute the task, a location of a required external resource, and one or more pre-execution configuration parameters required to execute the task, the task feeder is included in a communication module in a server, the server coupled to a plurality of leased ad-hoc computing resources;
 leasing at least one of the plurality of ad-hoc computing resources, wherein the server includes a look-up service, the look-up service including a list of the plurality of leased ad-hoc computing resources and the look-up service includes a plurality of attributes corresponding to each one of the leased ad-hoc computing resources;
 converting the first task to a DTF-specific format;
 scheduling the converted first task including:
  recording a plurality of server activities in a log manager;
  maintaining a wait queue in a queue manager, the wait queue including the task waiting to be executed, and
  maintaining an execution queue in a scheduler, the execution queue including a current status corresponding to one or more converted dispatched tasks;
 terminating the first task feeder;
 selecting at least one of the plurality of leased ad-hoc computing resources from the list wherein the selected at least one of the plurality of leased ad-hoc computing resources includes the corresponding plurality of attributes required to execute the converted task waiting to be executed in the wait queue;
 dispatching the converted task to the selected at least one of the plurality of leased ad-hoc computing resources at a selected time to execute the converted task; and
 maintaining the current status of the dispatched converted task in the execution queue.

26. The method of claim 25, further comprising:
 instantiating a second task feeder;
 receiving a second task in the second task feeder, wherein the second task is in a second task feeder-specific format;
 converting the second task to a DTF-specific format;
 scheduling the converted first task; and
 terminating the second task feeder.

27. A method of receiving tasks in a distributed test framework (DTF) comprising:
 receiving a first task wherein the task includes a corresponding plurality of computing system attributes required to execute the task, a location of a required external resource, and one or more pre-execution configuration parameters required to execute the task;
 identifying a first task feeder from a plurality of task feeders, the first task feeder being compatible with the first task;
 instantiating the first task feeder, the task feeder is included in a communication module in a server, the server coupled to a plurality of leased ad-hoc computing resources, the server including a look-up service, the look-up service including a list of the plurality of ad-hoc computing resources;
 leasing at least one of the plurality of ad-hoc computing resources, wherein, wherein the server includes a look-up service, the look-up service including a list of the plurality of leased ad-hoc computing resources and the look-up service includes a plurality of attributes corresponding to each one of the leased ad-hoc computing resources;
 converting the first task to a DTF-specific format;
 terminating the first task feeder; and
 scheduling the converted task including:
  recording a plurality of server activities in a log manager;
  maintaining a wait queue in a queue manager, the wait queue including the task waiting to be executed, and
  maintaining an execution queue in a scheduler, the execution queue including a current status corresponding to one or more converted dispatched tasks.

28. The method of claim 27 wherein converting the first task to the DTF-specific format includes storing the converted first task.

* * * * *